United States Patent [19]

Spiegel

[11] 4,388,966
[45] Jun. 21, 1983

[54] BURIED HEAT EXCHANGER

[75] Inventor: Werner Spiegel, Essen, Fed. Rep. of Germany

[73] Assignee: Thyssen Industrie AG, Fed. Rep. of Germany

[21] Appl. No.: 329,938

[22] Filed: Dec. 11, 1981

[30] Foreign Application Priority Data

Dec. 23, 1980 [DE] Fed. Rep. of Germany ....... 3048798

[51] Int. Cl.³ ................................................. F24J 3/02
[52] U.S. Cl. ..................................... 165/45; 60/641.2; 62/260
[58] Field of Search ............................ 165/45; 62/260; 60/641.2, 641.6

[56] References Cited

U.S. PATENT DOCUMENTS

| 1,974,244 | 9/1934 | Iapp | 165/45 |
| 4,234,037 | 11/1980 | Rogers et al. | 165/45 |
| 4,323,113 | 4/1982 | Troyer | 165/45 |

FOREIGN PATENT DOCUMENTS

2948417  6/1981  Fed. Rep. of Germany ........ 165/45

Primary Examiner—Sheldon J. Richter
Attorney, Agent, or Firm—McGlew and Tuttle

[57] ABSTRACT

A horizontal in-ground heat exchanger is disclosed which comprises an input line, a return line and a plurality of heat exchanger pipes connected between the input and return lines. The heat exchanger pipes are divided into a plurality of groups, each including several pipes. An input manifold is connected to at least some pipes in each group and a return manifold is also connected to at least some pipes in each group. The cross-sectional dimension of each manifold is selected to be substantially smaller than a crosswise dimension of each pipe group lying in a horizontal plane. Each pipe has a curved end portion connected to its respective input and return manifold.

18 Claims, 9 Drawing Figures

FIG. 8 POWER PLANT WITH AGROTHERMAL COOLING SYSTEM

*FIG. 9*

REVERSE CYCLE HEATING SYSTEM
Ground as Heat Source

BURIED HEAT EXCHANGER

FIELD AND BACKGROUND OF THE INVENTION

The present invention relates in general to heat exchangers and, in particular to a new and useful heat exchanger which is meant to be horizontally disposed in the ground, which can be utilized as a waste heat heat exchanger for power plants or to absorb excess heat from the ground.

The utilization of waste heat from various sources, has become a priority problem. Particularly in power plants, great amounts of energy are produced which are dissipated to the ambience in cooling towers. The use of wet cooling towers for dissipating waste heat is becoming more and more restricted by water economies and the use of dry cooling towers developed recently leads to a reduced utilization of the primary energy in the power plant.

A horizontally extending, buried heat exchanger is known for use as a cooling system for power plants, which utilizes the water-carried waste heat for warming agricultural areas. This makes it possible to increase agriculture yields, extend the period of growth, improve produce quality, and cultivate non-native plants. Further advantages are that the waste heat is employed in a manner which is kind to the enrironment, so that the location of the power plant can be chosen more freely and, as compared to power plants with dry cooling towers, the efficiency is improved.

In the prior art heat exchanger, the geometry of embedding the unit is such that at the forward and return ends of a certain amount of parallel extending cooling pipes, manifolds supplying and discharging the pipes are provided, each comprising a straight pipe which extends perpendicularly to the cooling pipes, in a length corresponding to, or slightly exceeding, the crosswise extension of the associated group of cooling pipes. These manifolds are connected to the forward or return line through a short connecting tube. The individual groups of cooling pipes are laid in the pattern of a grate which is quasi-rigidly fixed on its sides formed by the two straight manifolds, so that the occurring variations in length of the cooling pipes represent a strong mechanical load on the system. This makes the strength over time and the life of the system unsatisfactory and, particularly in power plants, the requirements of economy and safety are not met to a sufficient extent. This is due to the dilations and contractions of the mostly several hundred meters long cooling pipes under temperatures varying between a cold state and an operating level, which are hindered by the straight manifolds which are substantially fixed in their filled up trenches.

SUMMARY OF THE INVENTION

Accordingly, an object of the present invention is to provide a heat exchanger to be mounted horizontally in the ground, comprising an input line, a return line, a plurality of heat exchange pipes disposed substantially in a plane and substantially equi-distantly spaced from each other, the pipes being assembled into a plurality of groups of a plurality of pipes each, an input manifold connected to one end of at least some of the pipes in each group and a return manifold connected to an opposite end of at least some of the pipes in each group. Each input manifold is connected to the input line and each return manifold is connected to the return line. The input and return manifolds each have a cross sectional dimension which is substantially less than a crosswise dimension, in the plane, of each group of pipes. Each pipe has a curved end portion connected to at respective input and return manifolds.

The present invention is directed to a heat exchanger of the above-mentioned kind in which the stresses due to thermal loads of the cooling or heat exchange pipes and associated manifolds are eliminated to a large extent, especially at the respective connections, so as to ensure a long life of the heat exchanger.

Another object of the invention is to provide a heat exchanger wherein the lengthwise dimension, in a direction parallel to the longitudinal extension of the heat exchange pipes, is selected to be smaller than the crosswise dimension of the pipe groups.

A further object of the invention is to position the input manifolds, with respect to the return manifolds, at a staggered location along the input and return lines so that a connecting line between the input and return manifolds connected to pipes of a single group extends at an oblique angle to the longitudinal axis of the pipes.

Another object of the invention is to provide a heat exchanger wherein each group is supplied by a single input manifold and connected to two return manifolds which are located symmetrically about a central longitudinal axis of the group.

A still further object of the invention is to provide such a heat exchanger wherein the curved end portions of each pipe is approximately identical, particularly within one group of pipes and preferably for all cooling pipes of all groups.

A still further object of the invention is to provide a heat exchanger which is simple in design, rugged in construction and economical to manufacture.

The invention starts from the idea of minimizing the occurring stresses in the entire system of cooling pipes by designing it in a geometry slackening the structure and permitting an almost complete compensation for dilation so that no tensional and/or compressive stresses worth mentioning are transmitted to the manifolds serving the individual groups of cooling pipes.

The curved end portions, as a rule, are formed by the ends of the cooling pipes themselves, which are designed with a definite excess length for this purpose. Usually, these ends are made of the same material as the cooling pipes, preferably of a plastic such as hard polyethylene. The bends with the required length and curvature are made at the site, or already provided on prefabricated pipes. The curved ends, of course, participate in the function of transferring heat to or from the soil, so that the heat-exchange surface is not reduced as compared to prior art systems.

A minimum-stress, slackened structure of the bedded cooling pipes may also be obtained with manifolds according to the invention which are simple to manufacture and sufficiently long, thus permitting a great number of connections for the end portions of the cooling pipes.

The staggering of manifolds according to the invention provide for a favorable symmetry of the individual groups of cooling pipes and, consequently, permits the making of curved end portions which are widely identical or similar, and thus lay the pipes in a pattern which is well compensating for length variations.

The design according to another inventive feature, reduces the number of needed manifolds and also of shut-valves for controlling the water flow, so that maintenance and supervision are simplified while preserving the slack laying. This is an optimal utilization of the available wall surface of the manifolds in view of the maximum possible circulation of the water.

The requirement of making all of the individual cooling pipes within a similar group as uniform as possible, with regard to their minimum dilation, calls for a design of the pipes so that they include approximately identical curved end portions. This design also leads to uniform pressure drops in the lines and a correspondingly uniform transfer of heat to or from the soil.

The curved end portions between the straight ones of the cooling or heat exchange pipes and the manifolds also provide heat-exchange surfaces and perform therefore the same function as the straight and paralleld cooling pipes. It is advisable in accordance with another feature of the invention to use pipes of such extension that the individual cooling pipes along with their two cured end portions can be made of a single pipe length, at least in instances where it is not necessary, for purposes of handling, to employ shorter pieces.

A still further object of the invention is to provide such a heat exchanger wherein at least some of the pipes includes straight ends connected between the curved end portions and the respective manifolds.

The end portions of the cooling pipes need not be curved over their entire lengths. They may comprise a straight parallel portion, for example, a middle portion, especially if manifolds of particularly compact design are provided.

A particularly compact inventive manifold may be designed as a short, hollow vertical cylinder, with the connections for the curved end portions of the cooling pipes being provided in one or more rows on the outside of the cylinder. Such a manifold, which has circular horizontal cross-section, is particularly space saving and makes it possible to connect a great number of pipes to the manifold. Further, the manifold may be fixed in place while using its hollow, so that the wanted compensation for extension can be obtained in the curved end portions of the cooling pipes without a risk of damaging the system.

Further advantageous designs of the manifolds, provide for a simple, inexpensive manufacture and laying operation, particularly if a very large number of cooling pipes is to be connected thereto.

To vary the cooling or heat exchange characteristic, the cooling pipes which are otherwise connected in parallel in the heat exchanger, may be connected in series.

Should it be provided to lay the hot water forward line and the cool water return line in a common trench, for example, a U-shaped return bend can be provided near the middle of each pipe.

The various features of novelty which characterizes the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the following, some embodiments of the invention are explained in more detail with reference to the drawings in which.

DESCRIPTION OF THE PREFERRED EMBODIMENTS

Referring to the drawings in particular, the invention embodied therein comprises a horizontal inground heat exchanger having a plurality of groups of several heat exchange pipes each connected through input and return manifolds to respective input and return lines 1 and 2.

Figure 1:
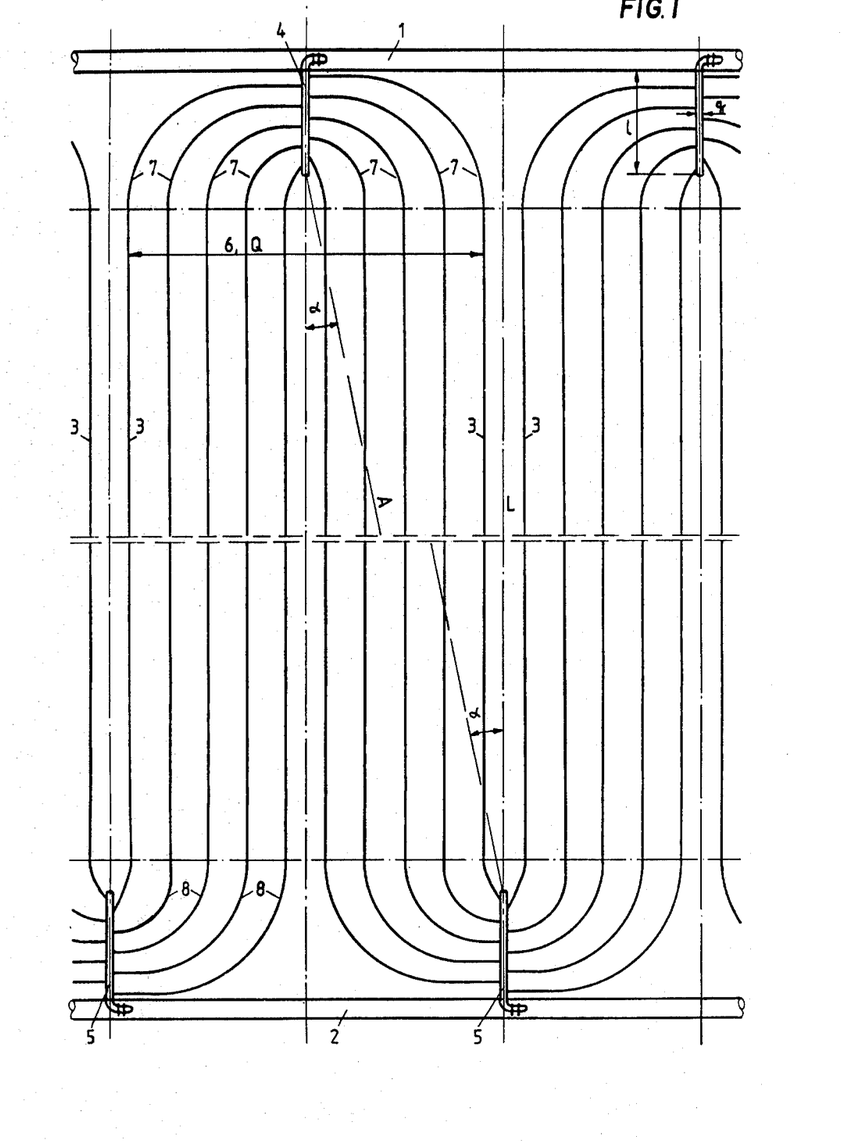
FIG. 1 is partial top plan view of a heat exchanger.

In the heat exchanger shown in FIG. 1, a hot (cold) water forward or input line 1 and a cool (hot) water return line 2 are laid in two trenches (not shown) which are spaced from each other by a predetermined distance. Lines 1 and 2 are connected to each other, with the interposition of manifolds 4,5, through a large number of parallel and equidistantly spaced heat exchange pipes 3. The individual manifolds 4, 5 each supply or discharge the water to be cooled or heated into or from a group 6 of several heat exchange pipes 3.

While it is understood that the invention can be used both for heating and cooling purposes, the following description will assuma a use of the invention to dissipate heat into the ground.

In the simplified view of FIG. 1, the group 6 of cooling pipes comprises ten cooling pipes 3. In practice, however, this number is substantially larger, for example, forty cooling pipes 3. The end portions 7, 8 of cooling pipes 3, connected to manifolds 4, 5, are curved by bending the excess length of the straight lead pipes which are made of a plastic, such as polyethylene. In the plane of bedding of the cooling pipes, the cross-sectional dimension q of manifolds 3,4 is very small as compared to the crosswise extension Q of cooling pipe group 6, and the length l of the manifolds is also much smaller than this extension Q.

Forward line manifolds 4 are staggered relative to return line manifolds 5, so that a connecting line A between opposite manifolds forms a definite angle $\alpha$ with the central longitudinal axis L of group 6 or with the longitudinal axis of cooling pipes 3. In a specific instance, an angle $\alpha$ is to be provided taking into account the respective desired cooling characteristic of the system depending on the length of cooling pipes 3, their spacing, and the number of cooling pipes in the group. The cooling pipe group 6 supplied through a single forward line manifold 4 connects to two return line manifolds 5 provided at locations which are symmetrical relative to the central longitudinal axis L of group 6. The sum of the lengths of curved end portions 7 at the supply side, and 8 at the return side, is substantially identical for all of the cooling pipes 3.

Figure 2:
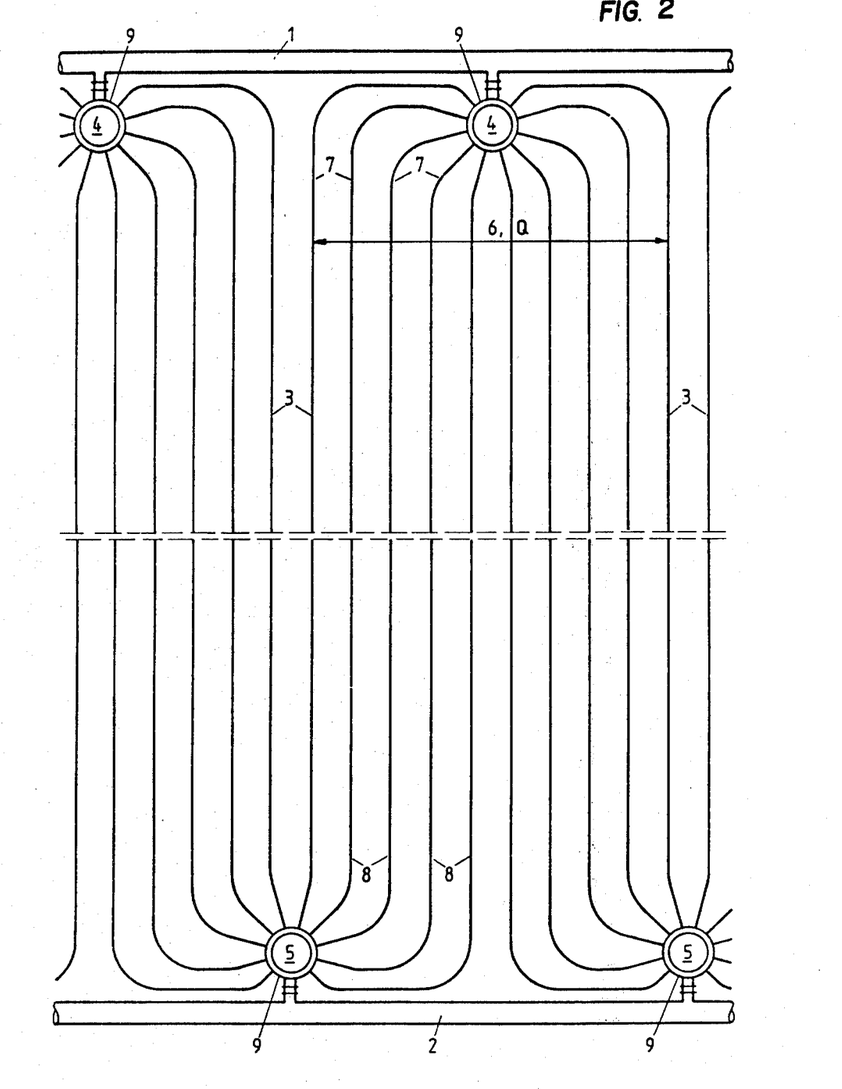
FIG. 2 shows the heat exchanger of FIG. 1 with modified manifolds.

The embodiment of FIG. 2 differs from FIG. 1 in that manifolds 4,5 are modified. They are designed as short vertical cylinders 9 having a circularly cylindrical water space. The radius of the cylinder is very small as compared to the crosswise extension Q of cooling pipe group 6. Again ten cooling pipes are shown in FIG. 2, while in practice, the number of cooling pipes may be 40 and more. To be able to connect such a great number to the outside of the cylinder wall of the manifold 4,5, the connections are provided in two or more rows one above the other (not shown). In this embodiment also, the sum of the lengths of end portions 7, 8 is approximately identical for all of cooling pipes 3.

Figure 3:
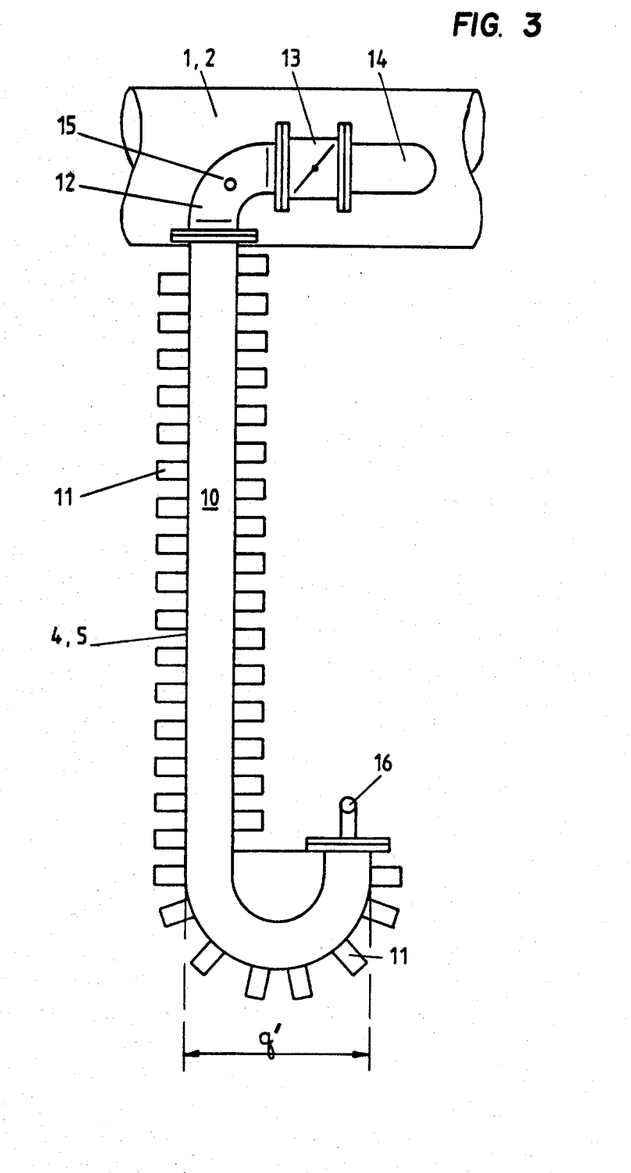
FIG. 3 shows another embodiment of the manifolds.

Another embodiment of the manifolds 4,5 is shown in FIG. 3. The manifold comprises a J-shape tube having forty pipe connections 11 which project perpendicularly from the tube wall and to which the end portions 7, 8 of cooling pipes 3 can be connected. Manifold 4,5 is connected through an elbow 12 to a shut-off valve 13, and a connection 14 to hot water forward line 1 or cold water return line 2. Further connections 15, 16, which are normally closed, permit emptying to and venting from the cooling pipe group. The location of these manifolds 4,5 within the system corresponds to that shown in FIG. 1. Their cross-sectional dimension q' is very small in comparison with the crosswise extension Q of the associated group 6 of cooling pipes.

Figures 4, 5:
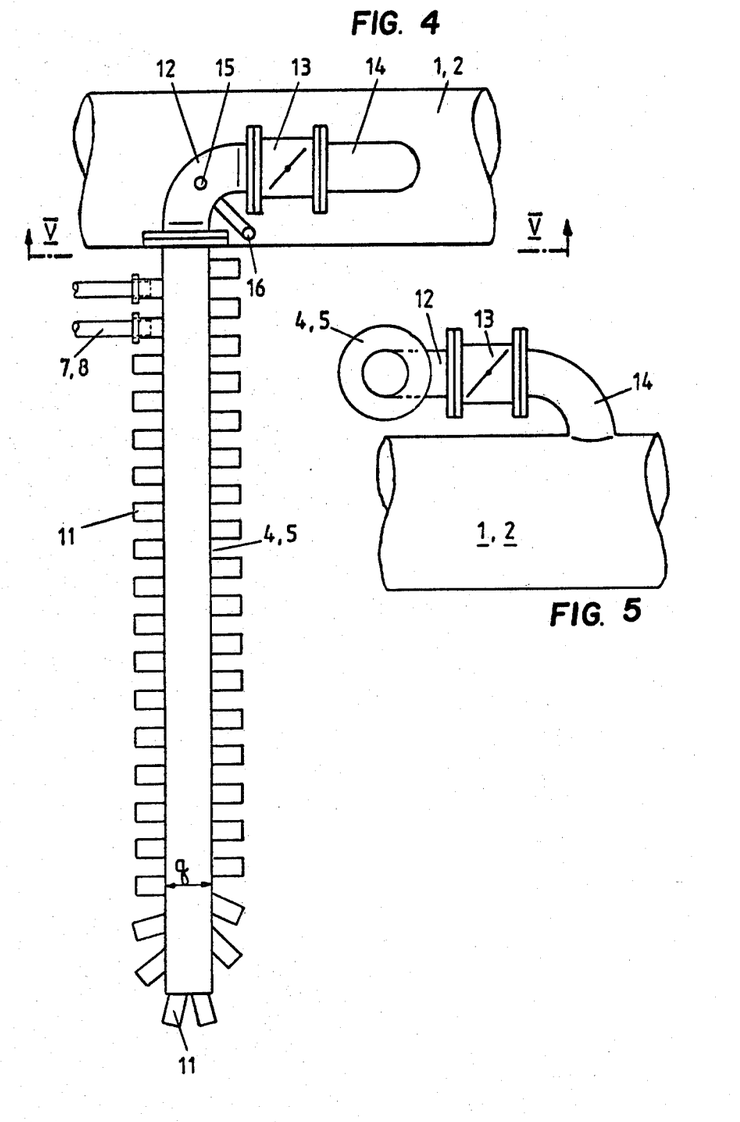
FIG. 4 is an enlarged view of a manifold corresponding to FIG. 1.
FIG. 5 is a sectional view taken along the line V—V of FIG. 4.

The manifolds of FIG. 1 are shown enlarged in FIG. 4 (top plan view) and FIG. 5 (section along the line V—V of FIG. 4). They comprise a straight cylindrical tube extending in the central longitudinal axis L of the associated groups 6 of cooling pipes (FIG. 1). Manifold 4, 5 is provided with pipe connections 11 for coaxially receiving the individual end portions 7, 8 of cooling pipes 3. At the end of manifold 4,5, some of connections 11 project from the tube wall in oblique directions for this purpose. Other elements are designated with reference numerals corresponding to those in the preceding figures.

Figure 6:
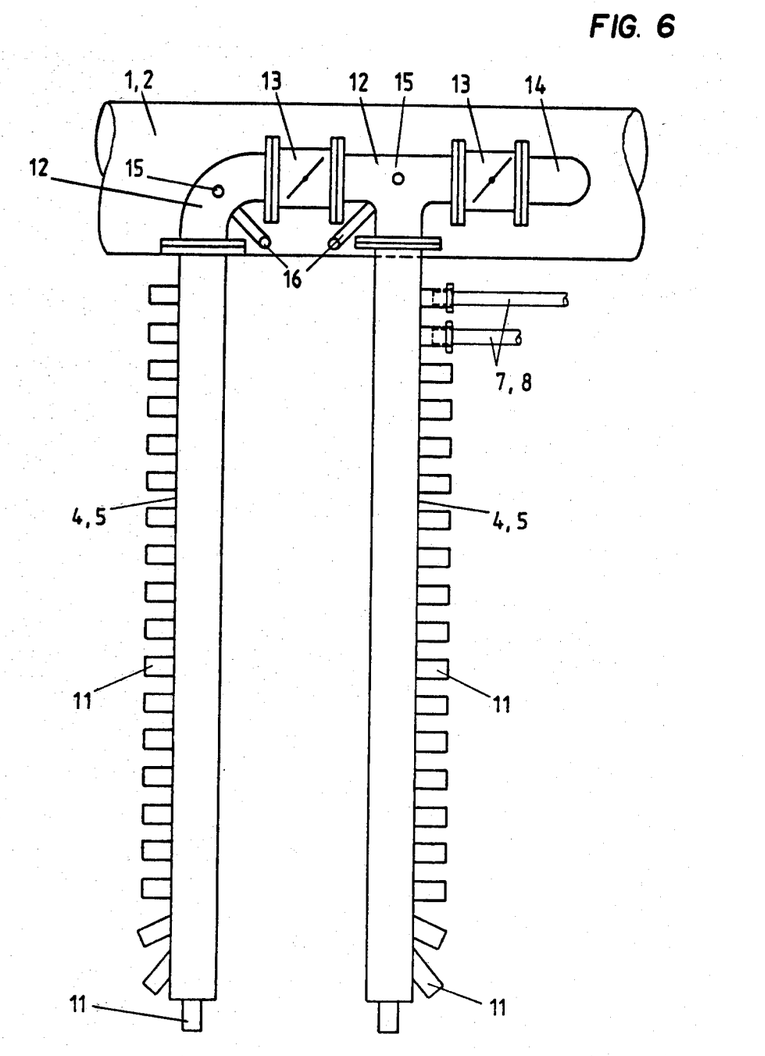
FIG. 6 shows still another embodiment of the manifolds.

In the embodiment of FIG. 6, manifold 4,5 comprises two cylindrical tubes extending substantially symmetrically of the central longitudinal axis L of the respective group 6 of cooling pipes (FIG. 1). Each of the two tubes of this manifold supply or discharge one half of the cooling pipes of the group, which makes it possible, by means of provided shut-off valves 13, to adjust different rates of flow therethrough. Particularly, while providing manifolds of this embodiment at only some of locations of the system, it is possible to shut off one part in case of a disturbance. Other reference numerals again indicate like elements in the preceding figures.

The functions of hot water forward line 1 and cool water return line 2, i.e., the water flow, may occasionally be reversed, if desired for obtaining a particular cooling characteristic. Means therefore are conventional (not shown). The cooling pipes of group 6 may also be connected to each other in series. By disconnecting them from the respective line, i.e, shutting off two adjacent manifolds 4,5 of the forward and return line 1,2, respectively, so that then the water flows, for example, from the hot water forward line through a first, still open manifold 4 into one half of the cooling pipe group and therefrom through a second, now shut-off manifold 5 into the following half of the cooling pipe group and through a third, again shut off manifold 4 into the next half of a cooling pipe group, to be discharged only through the manifold 5 which is not shut off, into the cool water return line 2. This may be desirable when there is insufficient temperature differential to obtain a desired heating or cooling by a single parallel passage of water.

Figure 7:
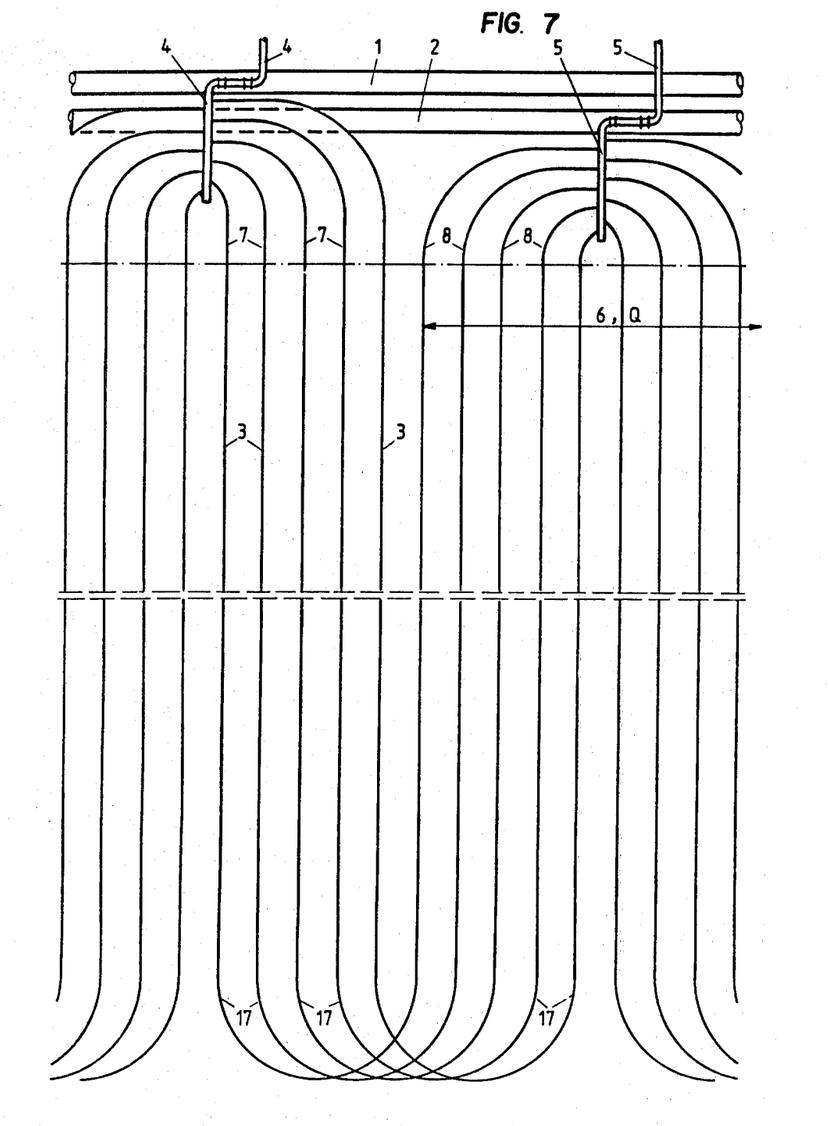
FIG. 7 is a partial view of a heat exchanger having its forward end return lines led close to each other.

FIG. 7 is a partial view of a system in which the hot water forward line 1 and the cool water return line are laid in a common trench, close to each other. In this case, the invention may also be applied in a simple way by designing cooling pipes 3 as loops having a U-shaped return bend 17 about in the middle of their length. In this design again, the end portions 7 at the forward line and the end portions 8 at the return line of cooling pipes 3 are curved or bent in the manner described above, and the manifolds comply with the dimensional conditions with respect to the crosswise extension of the respective group of cooling pipes. As indicated in FIG. 7, manifolds 4,5 may extend beyond (upwardly in the figure) forward and return lines 1, 2 to be connected to, and serve, a further system. For such a purpose, the manifold according to FIG. 2 (claim 10) with the cylindrical, vertically extending wall is also very satisfactory.

The inventive heat exchanger buried in the ground and including a great number of cooling pipes mostly having a length of several hundred meters provides a correspondingly extended free area for agricultural utilization. The zone of the hot water forward line 1, the associated manifolds 4 and end portions 7, usually provides an area of particularly high density of available waste heat. Advantageously, this may be utilized for placing in the area of greenhouses for hot-house plants, with the hot water line being left exposed, to obtain a high heat transfer through air convection.

As mentioned previously the heat exchanger of the invention can be used both to discharge heat into the ground and to receive heat from the ground. When used to receive heat from the ground the input line 1 becomes a cold water line and the return line 2 becomes a hot water line.

Figure 8:
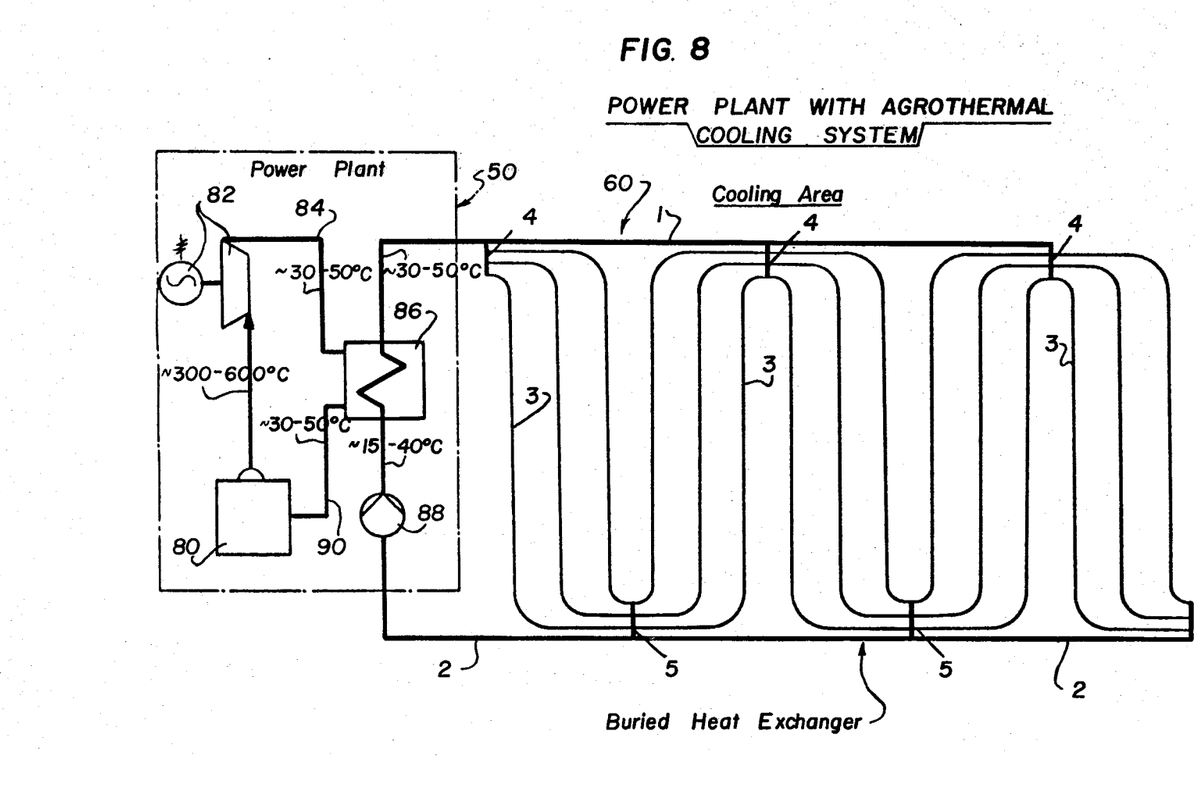
FIG. 8 is a diagrammatical layout of a bed-type cooling circuit of a power plant.

Turning to FIG. 8, the heat exchanger, in the form of an agro thermal cooling system is shown connected to a power plant. The power plant generally designated 50 is shown adjacent an area of earth generally designated 60 which is to receive the waste heat. The power plant comprises a stream generator 80, connected to a turbine generator 82. Saturated steam travels over line 84 to condensor 86 which is supplied with cool medium, preferably water by a pump 88. The condensate is supplied over line 90 back to the steam generator 80. The pump 88 and condensor 86 are connected to the hot water input line 1, of the heat exchanger, and to the return line 2.

Figure 9:
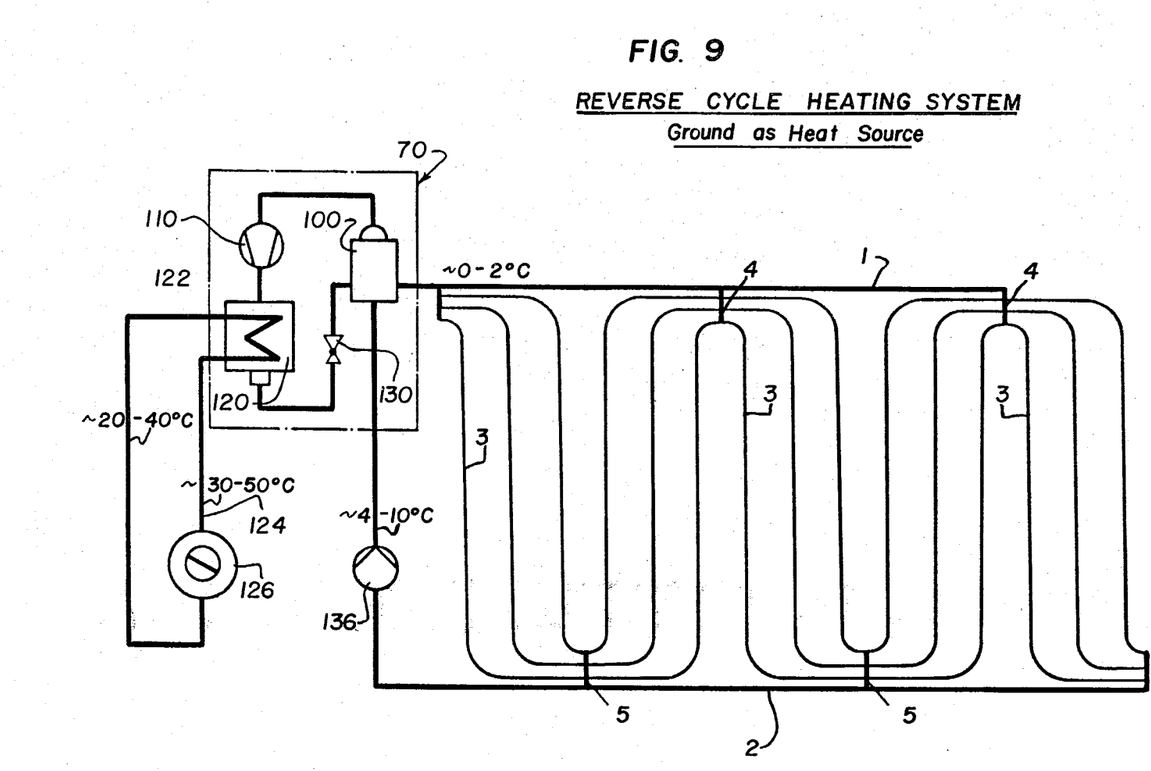
FIG. 9 is layout of a similar, reversed-cycle system using the ground as a source of heat.

In FIG. 9, the invention is shown connected to a power plant, such as a nuclear power plant which has an upper temperature limit which can be above the 600° sea limit of the power plant in FIG. 8.

In that figure, the power plant generally designated 70 includes a compressor 11 which supplies medium from an evaporator 100 to a condensor and heat exchanger 120. The fluid is then supplied over a pressure reducing valve 130 back to the evaporator 100. Heat exchanger 120 is connected over lines 122 and 124 to a point of use of the heat at 126. Heat transfer medium is pumped using a pump 136 to the evaporator 100. The input line 1 receives fluid from the line containing pressure reducing valve 130. The remaining features are designated with numerals corresponding to those used in the previous figures.

It is noted that the medium is preferably a mixture containing water plus an antifreeze, such as a 65% by volume water and 35% by volume ethylene glycol mixture. To this mixture an anticorrosion agent can be added in known fashion.

The invention can be stated generally as being a horizontal inground heat exchanger comprising:
  an input line (1);
  a return line (2);
  a plurality of heat exchange pipes (3) disposed substantially in a plane and substantially distantly spaced from each other, said pipes being assembled into a plurality of groups (6) of a plurality of pipes each;
  an input manifold (4) connected to one end of at least some of the pipes in each group; and
  a return manifold (5) connected to an opposite end of at least some of the pipes in each group;
  each input manifold connected to said input line and each return manifold connected to said return line;
  said input and return manifolds each having a cross sectional dimension (q) which is small with respect to a crosswise dimension (Q) of each group (6) in the plane;
  each pipe having a curved end portion (7,8) connected to a respective input and return manifold.

While specific embodiments of the invention have been shown and described in detail to illustrate the application of the principles of the invention, it will be understood that the invention may be embodied otherwise without departing from such principles.

The embodiments of the invention in which an exclusive property or privilege is claimed are as follows:

1. A horizontal inground heat exchanger comprising:
  an input line;
  a return line;
  a plurality of heat exchange pipes disposed substantially in a plane and substantially equidistantly spaced from each other, said pipes being assembled into a plurality of groups of a a plurality of pipes each;
  an input manifold connected to one end of at least some of the pipes in each group; and
  a return manifold connected to an opposite end of at least some of the pipes in each group;
  each input manifold connected to said input line and each return manifold connected to said return line;
  said input and return manifolds each having a cross sectional dimension which is small with respect to a crosswise dimension of each group in the plane;
  each pipe having a curved end portion connected to a respective input and return manifold.

2. A heat exchanger according to claim 1, wherein a lengthwise dimension in a direction parallel to a longitudinal extension of said heat exchanger pipes is smaller than the crosswise dimension of said groups.

3. A heat exchanger according to claim 1, wherein each input manifold of the pipes of one group is connected at a position which is staggered with respect to each return manifold connected to some pipes of said group so that a connecting line between respective input and return manifolds extends at an oblique angle to a line which is parallel to the longitudinal axis of said heat exchange pipes.

4. A heat exchanger according to claim 3, wherein said oblique angle is at most 5°.

5. A heat exchanger according to claim 3, wherein each group of pipes is connected to one manifold and to two return manifolds, said return manifolds being located symmetrically relative to a central longitudinal axis of said group.

6. A heat exchanger according to claim 1, wherein at least some of said groups include a first plurality of pipes with curved end portions connected to a respective manifold for supplying medium to said respective manifold and a second plurality of pipes having curved end portions connected to said manifold for discharging fluid from said manifold, the sum of the curved end portions of said first plurality of pipes being approximately the same as the sum of said second plurality of pipes.

7. A heat exchanger according to claim 1, wherein each pipe with its connected curved end portions is made as a single member.

8. A heat exchanger according to claim 1, wherein at least some of said heat exchange pipes have a straight portion connected between the curved end portion thereof and a respective manifold.

9. A heat exchanger according to claim 1, wherein at least some of said heat exchange pipes include a second curved portion spaced from said first mentioned curved portion and a straight portion between said first mentioned and second curved portions.

10. A heat exchanger according to claim 1, wherein each manifold comprises a vertical cylinder with a circular cylindrical cavity defined therein, the curved end portions of said heat exchange pipes connected to said cavity in at least one 11. A heat exchanger according to claim 1, wherein each manifold comprises a J-shaped tube with most of the curved end portions of said pipes connected to each respective manifold connected to a straight leg portion of said J-shaped tube, said curved end portion extending substantially perpendicularly to a longitudinal axis of said pipes at the point of connection between each curved end portion and the straight leg.

12. A heat exchanger according to claim 1, wherein each manifold includes at least one cylindrical tube extending in a direction substantially parallel to the longitudinal axis of said heat exchange tubes.

13. A heat exchanger according to claim 1, including a tubular connection connected to each manifold for concentricly receiving a curved end portion of a connected pipe.

14. A heat exchanger according to claim 13, where at least some of said tubular connections extend at an acute angle to a longitudinal axis of a connected pipe.

15. A heat exchanger according to claim 1, including a shut-off valve connected between each of said manifolds and a corresponding input or return line, each manifold connected to a first plurality of pipes for supplying medium to said manifold and a second plurality of pipes for discharging fluid from said manifold, said shut-off valve being closable to confine flow from said first plurality to said second plurality of pipes.

16. A heat exchanger according to claim 1, wherein said input and return lines are positionable in a common trench, each of said pipes being substantially U-shaped having a return bend substantially at the middle of the length of each pipe.

17. A heat exchanger according to claim 1, wherein each manifold comprises a pair of tubular portions extending substantially parallel to a major axis of said pipes, a cross pipe interconnecting one end of said tubular portions and connected to a respective one of said input and return lines.

18. A heat exchanger according to claim 17, including a first shut-off valve in said cross member between said first and second tubular portions and a second shut-off valve in said cross member between said respective input and return line and an adjacent one of said tubular members.

* * * * *